United States Patent
Wright et al.

(10) Patent No.: US 12,168,443 B1
(45) Date of Patent: *Dec. 17, 2024

(54) ELECTRICAL VEHICLES COMPRISING POWER DISTRIBUTION SYSTEMS AND METHODS OF OPERATING THEREOF

(71) Applicant: DIMAAG-AI, Inc., Fremont, CA (US)

(72) Inventors: Ian Wright, Woodside, CA (US); David Kieke, Carmine, TX (US)

(73) Assignee: DIMAAG-AI, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/537,101

(22) Filed: Dec. 12, 2023

Related U.S. Application Data (63) Continuation of application No. 18/332,979, filed on Jun. 12, 2023, now Pat. No. 11,878,693.

(Continued)

(51) Int. Cl.
 B60K 1/04 (2019.01)
 B60K 1/02 (2006.01)
 (Continued)

(52) U.S. Cl.
 CPC .......... B60W 30/1819 (2013.01); B60K 1/02 (2013.01); B60K 1/04 (2013.01); B60W 10/08 (2013.01);
 (Continued)

(58) Field of Classification Search
 CPC ............. B60W 30/1819; B60W 10/10; B60W 10/12; B60W 30/182; B60K 1/02; B60K 1/04
 See application file for complete search history.

(56) References Cited

U.S. PATENT DOCUMENTS

| | | | | |
|---|---|---|---|---|
| 3,585,473 | A * | 6/1971 | Huxtable | H02P 29/0022 318/140 |
| 5,627,438 | A * | 5/1997 | Barrett | B60L 3/04 903/916 |
| 6,476,571 | B1 * | 11/2002 | Sasaki | B60K 6/26 318/245 |

(Continued)

FOREIGN PATENT DOCUMENTS

| | | |
|---|---|---|
| JP | H09224301 A | 8/1997 |
| JP | 2007030642 A | 2/2007 |
| JP | 2010076678 A | 4/2010 |

OTHER PUBLICATIONS

"EV Auxiliary Systems Impacts", Advanced Vehicle Testing Activity, Idaho National Laboratory, Retrieved from the Internet on May 1, 2023: https://avt.inl.gov/sites/default/files/pdf/fsev/auxiliary.pdf.

(Continued)

*Primary Examiner* — Jason D Shanske
*Assistant Examiner* — James J Triggs
(74) *Attorney, Agent, or Firm* — Polygon IP, LLP (57) ABSTRACT

Described herein are electric vehicles comprising power distribution systems and methods of operating thereof. Specifically, a power distribution system is mechanically coupled to an electric motor, a road wheel, and an auxiliary unit. This system is configured to switch among multiple operating modes and selectively transfer mechanical power among the electric motor, wheel, and auxiliary unit. For example, the power distribution system is configured to transfer mechanical power between the electric motor and the road wheel, but not the auxiliary unit, when switched to a wheel operating mode. The power distribution system is configured to transfer mechanical power between the electric motor and the auxiliary unit, but not the road wheel, when switched to an auxiliary operating mode. The power distribution system is configured to transfer mechanical power between the electric motor, the auxiliary unit, and the (Continued)

road wheel when the system is switched to a combined operating mode.

20 Claims, 6 Drawing Sheets

Related U.S. Application Data (60) Provisional application No. 63/507,210, filed on Jun. 9, 2023.

(51) Int. Cl.
*B60W 10/08* (2006.01)
*B60W 10/10* (2012.01)
*B60W 10/12* (2012.01)
*B60W 30/18* (2012.01)
*B60W 30/182* (2020.01)

(52) U.S. Cl.
CPC ............ *B60W 10/10* (2013.01); *B60W 10/12* (2013.01); *B60W 30/182* (2013.01)

(56) References Cited

U.S. PATENT DOCUMENTS

| | | | |
|---|---|---|---|
| 6,847,127 B1 * | 1/2005 | Lee | .......................... B60L 58/34 290/40 C |
| 7,201,010 B2 | 4/2007 | Homan et al. | |
| 9,688,114 B2 | 6/2017 | Sakai | |
| 11,607,952 B1 * | 3/2023 | Wright | ................. B60K 17/356 |
| 11,878,693 B1 * | 1/2024 | Wright | ...................... B60L 1/20 |
| 2003/0116368 A1 | 6/2003 | Winkelman et al. | |
| 2008/0243324 A1 * | 10/2008 | Harris | ................... B60W 20/00 903/902 |
| 2009/0034306 A1 * | 2/2009 | Inaba | .................... B60L 15/007 363/131 |
| 2011/0169448 A1 * | 7/2011 | Ichikawa | ................ B60L 58/12 320/109 |
| 2020/0269659 A1 | 8/2020 | Norden | |

OTHER PUBLICATIONS

U.S. Appl. No. 18/332,979, Non Final Office Action mailed Sep. 7, 2023, 7 pgs.

U.S. Appl. No. 18/332,979, Notice of Allowance mailed Sep. 20, 2023, 10 pgs.

Ramos, Alex; "How Does the Air Conditioning in an EV Work?", MUO Newsletter, Oct. 11, 2022; Retrieved from the Internet: https://www.makeuseof.com/how-does-ev-air-conditioning-work/.

International Application Serial No. PCT/US24/32425, Search Report and Written Opinion mailed Sep. 24, 2024, 10 pgs.

* cited by examiner

ELECTRICAL VEHICLES COMPRISING POWER DISTRIBUTION SYSTEMS AND METHODS OF OPERATING THEREOF

CROSS-REFERENCE TO RELATED APPLICATIONS

This application is a continuation of U.S. patent application Ser. No. 18/332,979, filed on 2023 Jun. 12, which claims the benefit under 35 U.S.C. § 119 (e) of U.S. Provisional Patent Application 63/507,210, filed on 2023 Jun. 9, both of which are incorporated herein by reference in their entirety for all purposes.

BACKGROUND

An electric vehicle is propelled using one or more electric motors (e.g., one per wheel, one per axle, and/or one shared by multiple axles) using power supplied from a battery pack. These vehicle-propelling electric motors are mechanically coupled to the vehicle wheels (e.g., using various power transmission systems). Typically, this coupling is continuous/permanent. In other words, when the vehicle is stationary, the electric motors cannot rotate due to this permanent wheel-to-motor coupling. At the same time, various auxiliary systems (e.g., air-conditioning compressors, hydraulic pumps, and the like) require mechanical power for their operation. Such systems are typically driven using their own/dedicated electric motors (different from vehicle-propelling electric motors). For example, an air-conditioning compressor can be connected to a small electric motor used to specifically drive this compressor when needed and independent of the operation of the vehicle-propelling electric motors and the movement of the vehicle. As such, the air-conditioning compressor can be operated when the vehicle is stationary. However, using a dedicated electric motor for each auxiliary system increases the complexity, weight, and cost of electric vehicles.

While vehicle-propelling electric motors can potentially be used for mechanically powering these auxiliary systems, the permanent wheel-to-motor coupling limits when the power can be available to the auxiliary systems. For example, the power from these vehicle-propelling electric motors is not available when the vehicle is stationary, since the vehicle-propelling electric motors are also stationary due to the continuous/permanent coupling between these motors and the vehicle's wheels. This limitation is generally not acceptable for some types of vehicle operations (e.g., cooling the interior of a passenger vehicle, cooling the vehicle's battery pack, and the like). Furthermore, in most types of electric vehicles (e.g., heavy vehicles), these vehicle-propelling electric motors are simply too powerful (and therefore inefficient) for powering only such auxiliary systems (i.e., when the vehicle is stationary and no power is needed at the wheels). For example, a typical vehicle-propelling electric motor used on passenger vehicles has a power rating of over 100 KW, while a typical air-conditioning compressor requires less than 2 kW of power. Using a 100 kW-rated electric motor to deliver 2 kW of power is extremely inefficient and results in excessive power consumption, faster battery discharge, and reduced vehicle range.

What is needed are new types of power distribution systems on electric vehicles and methods of operating thereof.

SUMMARY

Described herein are electric vehicles comprising power distribution systems and methods of operating thereof. Specifically, a power distribution system is mechanically coupled to an electric motor, at least one of the vehicle's road wheels, and an auxiliary unit. This system is configured to switch among multiple operating modes and selectively transfer mechanical power among these coupled components. For example, the power distribution system is configured to transfer mechanical power between the electric motor and the road wheel, but not the auxiliary unit, when switched to a wheel operating mode. The system is further configured to transfer mechanical power between the electric motor and the auxiliary unit, but not the road wheel, when switched to an auxiliary operating mode. The system is also configured to transfer mechanical power between the electric motor, the auxiliary unit, and the road wheel when the system is switched to a combined operating mode.

Provided is a method of operating an electric vehicle comprising an electric motor, a wheel supporting the electric vehicle relative to a road, an auxiliary unit, and a power distribution system comprising an auxiliary engagement unit and a wheel engagement unit. The terms "wheel" and "road wheel" are used herein interchangeably and should be distinguished from other types of vehicle wheels, e.g., steering wheels. The auxiliary engagement unit is mechanically coupled to the auxiliary unit and the electric motor. The wheel engagement unit is mechanically coupled to the wheel and the electric motor. The method comprises switching the power distribution system to a wheel operating mode by engaging the wheel engagement unit and disengaging the auxiliary engagement unit thereby transferring mechanical power between the electric motor and the wheel but not the auxiliary unit. In this wheel operating mode, the electric motor is mechanically coupled to the wheel and mechanically decoupled from the auxiliary unit. The method also comprises switching the power distribution system to an auxiliary operating mode by disengaging the wheel engagement unit and engaging the auxiliary engagement unit thereby transferring mechanical power between the electric motor and the auxiliary unit but not the wheel. In the auxiliary operating mode, the electric motor is mechanically coupled to the auxiliary and mechanically decoupled from the wheel. The method further comprises switching the power distribution system to a combined operating mode by engaging both the wheel engagement unit and the auxiliary engagement unit thereby transferring mechanical power between the electric motor and each of the auxiliary unit and the wheel. In this combined operating mode, the electric motor is mechanically coupled to each of the auxiliary and the wheel, and wherein the auxiliary unit is one of an alternator, an air conditioner, a heat pump, a hydraulic pump, or a power takeoff (PTO) unit.

In some examples, the maximum power demand ratio of the auxiliary unit to the electric motor is between 0.1 and 0.8. In some examples, the power distribution system comprises a motor-side shaft permanently coupled to the electric motor and also coupled to each of the auxiliary engagement unit and the wheel engagement unit. In some examples, the auxiliary engagement unit is an electromagnetic clutch.

In some examples, the wheel engagement unit is a gearbox having a neutral gear. In these examples, switching the power distribution system to the auxiliary operating mode comprises switching the gearbox into the neutral gear. In more specific examples, the gearbox of the wheel engagement unit has multiple drive gears corresponding to different rotational speed ratios of a gearbox input shaft and a gearbox output shaft. The gearbox input shaft is mechanically coupled to the electric motor and to the auxiliary engagement unit. The gearbox output shaft is mechanically coupled to the wheel.

In some examples, the power distribution system further comprises a motor engagement unit mechanically coupled to the electric motor and each of the auxiliary engagement unit and the wheel engagement unit. The method further comprises switching the power distribution system to an unpowered operating mode by disengaging the motor engagement unit and engaging each of the the wheel engagement unit and the auxiliary engagement unit thereby transferring mechanical power between the auxiliary unit and the wheel but not the electric motor. In the unpowered operating mode, the wheel and the auxiliary and mechanically coupled to each other and decoupled from the electric motor. In some examples, the motor engagement unit is a clutch. Furthermore, the motor engagement unit is an optional component and is not present in some examples (e.g., the electric motor is permanently coupled to each of the auxiliary engagement unit and the wheel engagement unit.

In some examples, the wheel is part of a drive axle comprising an additional wheel. The additional wheel is coupled to the power distribution system. In the wheel operating mode, the electric motor is mechanically coupled to both the wheel and the additional wheel and mechanically decoupled from the auxiliary unit. In the auxiliary operating mode, the electric motor is mechanically coupled to the auxiliary and mechanically decoupled from both the wheel and the additional wheel. In the combined operating mode, the electric motor is mechanically coupled to each of the auxiliary and both the wheel and the additional wheel.

In some examples, the vehicle comprises an additional electric motor, an additional power distribution system mechanically coupled to the additional electric motor, an additional wheel mechanically coupled to the additional power distribution system, and an additional auxiliary unit mechanically coupled to the additional power distribution system. The additional power distribution system is configured to operate in the same manner as but independently from the power distribution system.

In some examples, an electric vehicle comprises a battery, an electric motor electrically coupled to the battery, a power distribution system mechanically coupled to the electric motor, a wheel mechanically coupled to the power distribution system, and an auxiliary unit mechanically coupled to the power distribution system. The power distribution system is configured to switch among multiple operating modes and selectively transfer mechanical power among the electric motor, the wheel, and the auxiliary unit. The multiple operating modes comprise a wheel operating mode, an auxiliary operating mode, and a combined operating mode. Specifically, the power distribution system is configured to transfer the mechanical power between the electric motor and the wheel but not the auxiliary unit when the power distribution system is switched to the wheel operating mode. The power distribution system is configured to transfer the mechanical power between the electric motor and the auxiliary unit but not the wheel when the power distribution system is switched to the auxiliary operating mode. The power distribution system is configured to transfer the mechanical power between the electric motor and each of the auxiliary unit and the wheel when the power distribution system is switched to the combined operating mode.

In some examples, the electric vehicle is one of a tractor and a rugged terrain vehicle (RTV). In the same or other examples, the auxiliary unit is one of an alternator, an air conditioner, a heat pump, a hydraulic pump, or a power takeoff (PTO) unit. In some examples, the maximum power demand ratio of the auxiliary unit to the electric motor is between 0.1 and 0.8, thereby ensuring the efficient operation of the electric motor when powering only the auxiliary unit.

In some examples, the power distribution system comprises an auxiliary engagement unit and a wheel engagement unit. The auxiliary engagement unit is mechanically coupled to the auxiliary unit and engaged in both the auxiliary operating mode of the power distribution system and the combined operating mode and is disengaged in the wheel operating mode of the power distribution system. The wheel engagement unit is mechanically coupled to the wheel and engaged in both the wheel operating mode of the power distribution system and the combined operating mode and is disengaged in the auxiliary operating mode of the power distribution system. For example, the power distribution system comprises a motor-side shaft permanently coupled to the electric motor and to each of the auxiliary engagement unit and the wheel engagement unit. In some examples, the auxiliary engagement unit is a clutch or, more specifically, an electromagnetic clutch. In some examples, the wheel engagement unit is a gearbox configured to switch to a neutral gear when the power distribution system is in the wheel operating mode. For example, the gearbox of the wheel engagement unit may have multiple drive gears corresponding to different rotational speed ratios of the auxiliary unit and the wheel when the power distribution system is in the combined operating mode.

In some examples, the multiple operating modes further comprise an unpowered operating mode. The power distribution system is configured to transfer the mechanical power between the wheel and the auxiliary unit, but not the electric motor, when the power distribution system is switched to the unpowered operating mode.

In some examples, the power distribution system comprises a motor engagement unit. The motor engagement unit is engaged in each of the auxiliary operating mode, the wheel operating mode, and the combined operating mode of the power distribution system. The motor engagement unit is disengaged in the unpowered operating mode of the power distribution system. In some examples, the motor engagement unit is a clutch.

In some examples, the wheel is part of a drive axle comprising an additional wheel and is coupled to the power distribution system. In the same or other examples, the wheel is coupled to and driven by the power distribution system, independently from any other wheels of the electric vehicle.

In some examples, the electric vehicle further comprises an additional electric motor electrically coupled to the battery, an additional power distribution system mechanically coupled to the additional electric motor, an additional wheel mechanically coupled to the additional power distribution system, and an additional auxiliary unit mechanically coupled to the additional power distribution system, wherein the additional power distribution system is configured to operate in the same manner as but independently from the power distribution system. In more specific examples, the wheel and the additional wheel are on the same axle. Alternatively, the wheel and the additional wheel are different axles.

In some examples, a method of operating an electric vehicle comprises providing the electric vehicle comprising a battery, an electric motor electrically coupled to the battery, a power distribution system mechanically coupled to the electric motor, a wheel, mechanically coupled to the power distribution system, and an auxiliary unit mechanically coupled to the power distribution system. The power distribution system is configured to switch among multiple operating modes and selectively transfer mechanical power from the electric motor to one or both of the wheel and the auxiliary unit. The multiple operating modes comprise a wheel operating mode, an auxiliary operating mode, and a combined operating mode. The method comprises switching the power distribution system to the wheel operating mode such that the power distribution system transfers the mechanical power between the electric motor and the wheel but not the auxiliary unit. The method further comprises switching the power distribution system to the auxiliary operating mode such that the power distribution system transfers the mechanical power between the electric motor and the auxiliary unit but not the wheel. The method also comprises switching the power distribution system to the combined operating mode such that the power distribution system transfers the mechanical power between the electric motor and both the auxiliary unit and the wheel.

In some examples, the power distribution system comprises an auxiliary engagement unit and a wheel engagement unit. The auxiliary engagement unit is mechanically coupled to the auxiliary unit. The wheel engagement unit is mechanically coupled to the wheel. In these examples, switching the power distribution system to the wheel operating mode comprises engaging the wheel engagement unit and disengaging the auxiliary engagement unit. Furthermore, switching the power distribution system to the auxiliary operating mode comprises disengaging the wheel engagement unit and engaging the auxiliary engagement unit. Finally, switching the power distribution system to the combined operating mode comprises engaging both the wheel engagement unit and the auxiliary engagement unit.

In some examples, the wheel engagement unit is a gearbox comprising a neutral gear. In these examples, disengaging the wheel engagement unit comprises switching the gearbox to the neutral gear. In more specific examples, the gearbox comprises multiple drive gears in addition to the neutral gear. Engaging the wheel engagement unit may comprise switching the gearbox into one of the multiple drive gears. In some examples, the method further comprises selecting one of the multiple operating modes for switching the power distribution system based on one or both of a driver input and a controller input.

Also provided is a power distribution system for use on an electric vehicle. The power distribution system comprises a motor-side shaft for mechanically coupling to an electric motor of the electric vehicle, an auxiliary engagement unit for mechanically coupling to the auxiliary unit of the electric vehicle, and a wheel engagement unit for mechanically coupling to a wheel of the electric vehicle. The power distribution system is configured to switch among multiple operating modes and selectively transfer mechanical power among the electric motor, the wheel, and the auxiliary unit. The multiple operating modes comprise a wheel operating mode, an auxiliary operating mode, and a combined operating mode. The power distribution system is configured to transfer the mechanical power between the electric motor and the wheel but not the auxiliary unit when the power distribution system is switched to the wheel operating mode. The power distribution system is configured to transfer the mechanical power between the electric motor and the auxiliary unit but not the wheel when the power distribution system is switched to the auxiliary operating mode. The power distribution system is configured to transfer the mechanical power between the electric motor and each of the auxiliary unit and the wheel when the power distribution system is switched to the combined operating mode.

In some examples, the auxiliary engagement unit is mechanically coupled to the auxiliary unit. The wheel engagement unit is mechanically coupled to the wheel. Switching the power distribution system to the wheel operating mode comprises engaging the wheel engagement unit and disengaging the auxiliary engagement unit. Switching the power distribution system to the auxiliary operating mode comprises disengaging the wheel engagement unit and engaging the auxiliary engagement unit. Furthermore, switching the power distribution system to the combined operating mode comprises engaging both the wheel engagement unit and the auxiliary engagement unit. In some examples, the auxiliary engagement unit is an electromagnetic clutch. The wheel engagement unit may be a gearbox configured to switch to a neutral gear when the power distribution system is in the wheel operating mode.

In some examples, the multiple operating modes further comprise an unpowered operating mode. The power distribution system is configured to transfer the mechanical power between the wheel and the auxiliary unit but not the electric motor when the power distribution system is switched to the unpowered operating mode. For example, the power distribution system comprises a motor engagement unit. The motor engagement unit is engaged in each of the auxiliary operating mode, the wheel operating mode, and the combined operating mode of the power distribution system. The motor engagement unit is disengaged in the unpowered operating mode of the power distribution system.

DETAILED DESCRIPTION

In the following description, numerous specific details are outlined to provide a thorough understanding of the present invention. The present invention may be practiced without some or all of these specific details. In other instances, well-known process operations have not been described in detail to avoid obscuring the present invention. While the invention will be described in conjunction with the specific examples, it will be understood that it is not intended to limit the invention to the examples.

Introduction

Similar to vehicles with internal combustion engines (ICE), electric vehicles have various auxiliary units, some of which may require mechanical power to operate (e.g., power steering, power brakes, air conditioning, and battery cooling/pumping unit). A conventional approach is to use a dedicated electric motor for each auxiliary unit to provide this mechanical power. Such an electric motor can be turned on when mechanical power is needed (e.g., to drive a compressor while cooling a vehicle interior or a battery pack). This individual auxiliary motor approach used in electric vehicles is in contrast to ICE vehicles, in which a constantly running ICE can provide continuous mechanical power for such auxiliary units, e.g., using an auxiliary belt. It should be noted that providing a dedicated electric motor for each auxiliary unit adds to the total vehicle cost, weight, and complexity.

As noted above, conventional vehicle-propelling electric motors, which are used on typical passenger electric vehicles and/or electric trucks, are not suitable for powering vehicles' auxiliary systems (e.g., air-conditioning compressors and hydraulic pumps). First, such electric motors are continuously connected to vehicle wheels (e.g., through various types of transmissions such as single-speed transmissions). Second, such motors are simply too powerful and wasteful to power auxiliary systems, with a ratio of the maximum power output (by a vehicle-propelling electric motor) to the maximum power demand (by an auxiliary unit) exceeding 50 or even exceeding 100.

However, various specialty electric vehicles may not have these limitations (i.e., the continuous motor-to-wheel connection and the high ratios of the power output to power demand) or these limitations can be addressed with various systems described below. For example, a tractor and/or a rugged terrain vehicle (RTV) may use vehicle-propelling electric motors that have much lower power (e.g., under 20 kW or even under 10 kW). Such lower-power motors are suitable for lower-speed applications (e.g., tractors) and/or light vehicles (e.g., RTV). For comparison, vehicle-propelling electric motors used on passenger cars often exceed 100 kW. Furthermore, multiple lower-power motors can be used on the same vehicle (e.g., one per axle or even one per wheel).

Using multiple motors to propel the vehicle reduces the power output requirements from each motor. Additionally, such specialty electric vehicles are often equipped with sophisticated power transmission systems, e.g., a gearbox having a neutral gear that allows decoupling the electric motor from the vehicle's wheels and operating the electric motor (e.g., to power an auxiliary unit) while the vehicle is stationary. Finally, many specialty electric vehicles require much larger power for their auxiliary systems (e.g., a power takeoff (PTO) unit on a tractor). At least the power ratio provided by the vehicle-propelling electric motors and demanded by the auxiliary systems can be a lot smaller than for typical passenger electric vehicles and/or electric trucks listed above.

Described herein are electric vehicles comprising novel power distribution systems and methods of operating thereof. Specifically, a power distribution system is mechanically coupled to an electric motor, at least one wheel, and an auxiliary unit. The power distribution system is configured to switch among multiple operating modes and selectively transfer mechanical power among the electric motor, wheel, and auxiliary unit. These modes are selected to selectively connect the electric motor, one or more road wheels, and auxiliary unit in various combinations thereby allowing different types of power transfers within the vehicle. It should be noted that the power distribution system can be connected to a single road wheel, two road wheels positioned on the same axles, or even multiple road wheels positioned on multiple axles. For simplicity, the reference is made to a road wheel or simply a wheel, which includes all of these examples (unless specifically excluded).

For example, when the power distribution system is switched to a wheel operating mode, the power distribution system is configured to transfer mechanical power between the electric motor and the road wheel, but not the auxiliary unit. In this mode, the auxiliary unit is mechanically disconnected from the auxiliary unit, while the road wheel and the electric motor remain connected. This mode can be used when the vehicle is moving and when the auxiliary unit does not require any power (e.g., an air-conditioning unit is off, power steering is not required). When the power distribution system is switched to an auxiliary operating mode, the power distribution system is configured to transfer mechanical power between the electric motor and the auxiliary unit, but not the road wheel. In this mode, the auxiliary unit is mechanically connected to the electric motor, while the road wheel is disconnected from the electric motor. This mode can be used when the auxiliary unit requires power (e.g., an air-conditioning unit is on), while the vehicle is stationary. When the power distribution system is switched to a combined operating mode, the power distribution system is configured to transfer mechanical power between the electric motor and each of the auxiliary unit and the road wheel. In other words, both the auxiliary unit and the road wheel are mechanically coupled to the electric motor at the same time. This mode can be used when the auxiliary unit requires power (e.g., an air-conditioning unit is on), while the vehicle is moving. Additional operating modes and various aspects of the power distribution system will now be described in more detail.

The switch among these operating modes can be performed using various mechanisms of the power distribution system, e.g., an auxiliary engagement unit and a wheel engagement unit. Specifically, the auxiliary engagement unit allows the selective coupling of the auxiliary unit and motor, independently from the motor-to-wheel coupling. For example, when the auxiliary engagement unit is engaged the auxiliary unit is mechanically coupled to the motor. When the auxiliary engagement unit is disengaged the auxiliary unit is mechanically decoupled from the motor. Some examples of suitable auxiliary engagement units include clutches, such as electromagnetic clutches.

Similarly, the wheel engagement unit allows the selective coupling of the wheel and motor, independently from the motor-to-auxiliary unit coupling. For example, when the wheel engagement unit is engaged the wheel is mechanically coupled to the motor. When the wheel engagement unit is disengaged the wheel is mechanically decoupled to the motor. Some examples of suitable when engagement units include gearboxes, such as a gearbox with a neutral gear (corresponding to the disengaged state of the wheel engagement unit).

Electric Vehicle Examples

Figure 1A:
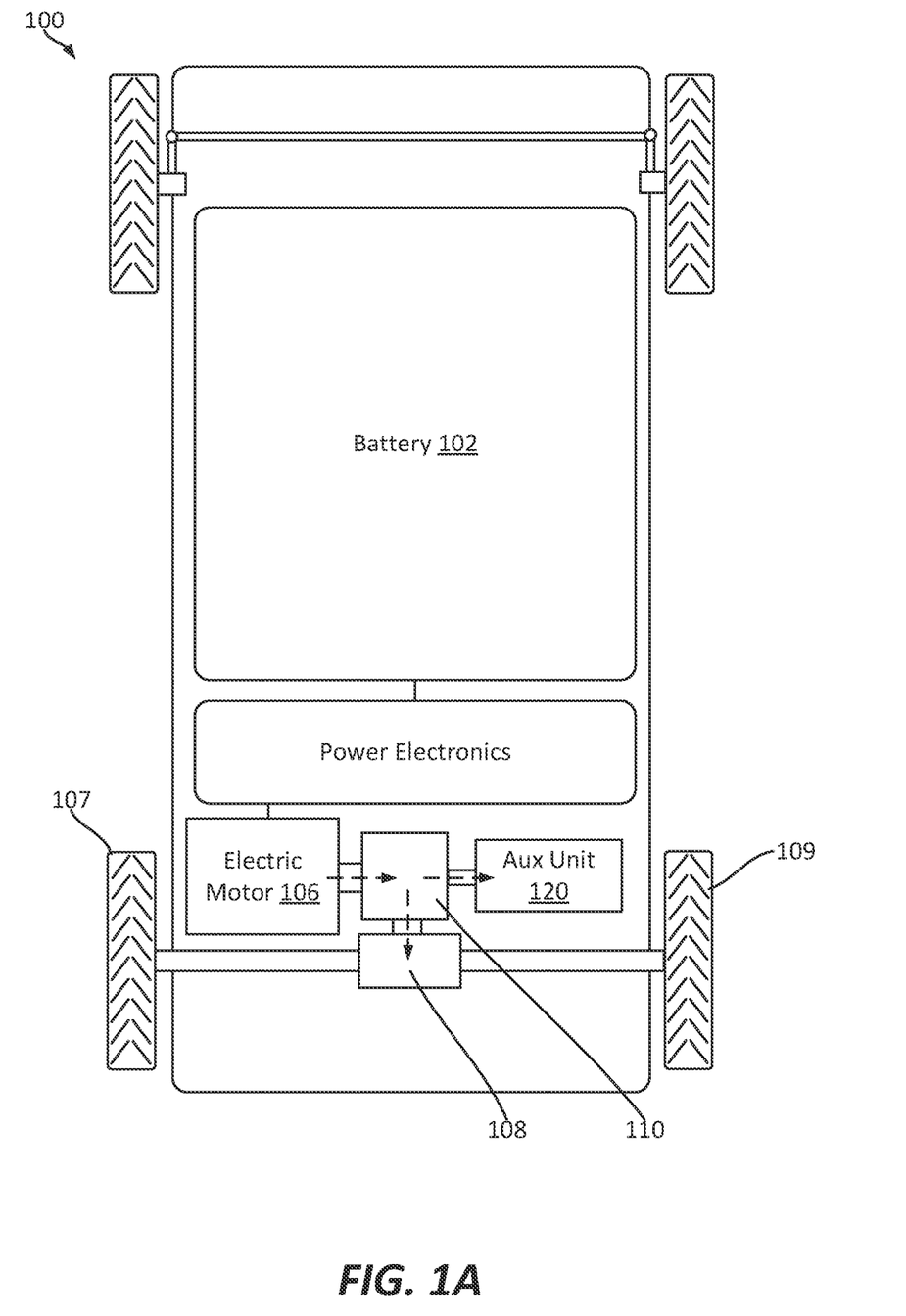
FIG. 1A is a schematic representation of one example of an electric vehicle comprising a power distribution system configured to switch among multiple operating modes and selectively transfer mechanical power among the electric motor, wheel, and auxiliary unit.

FIG. 1A is a schematic illustration of one example of electric vehicle 100 comprising power distribution system 110 configured to switch among multiple operating modes and selectively transfer mechanical power among electric motor 106, road wheel 107, and auxiliary unit 120. In this example, the power from electric motor 106 is shared by two wheels (road wheel 107 and additional road wheel 109) forming drive axle 108. This example may be referred to as a one-motor-per-axle configuration.

Figure 1B:
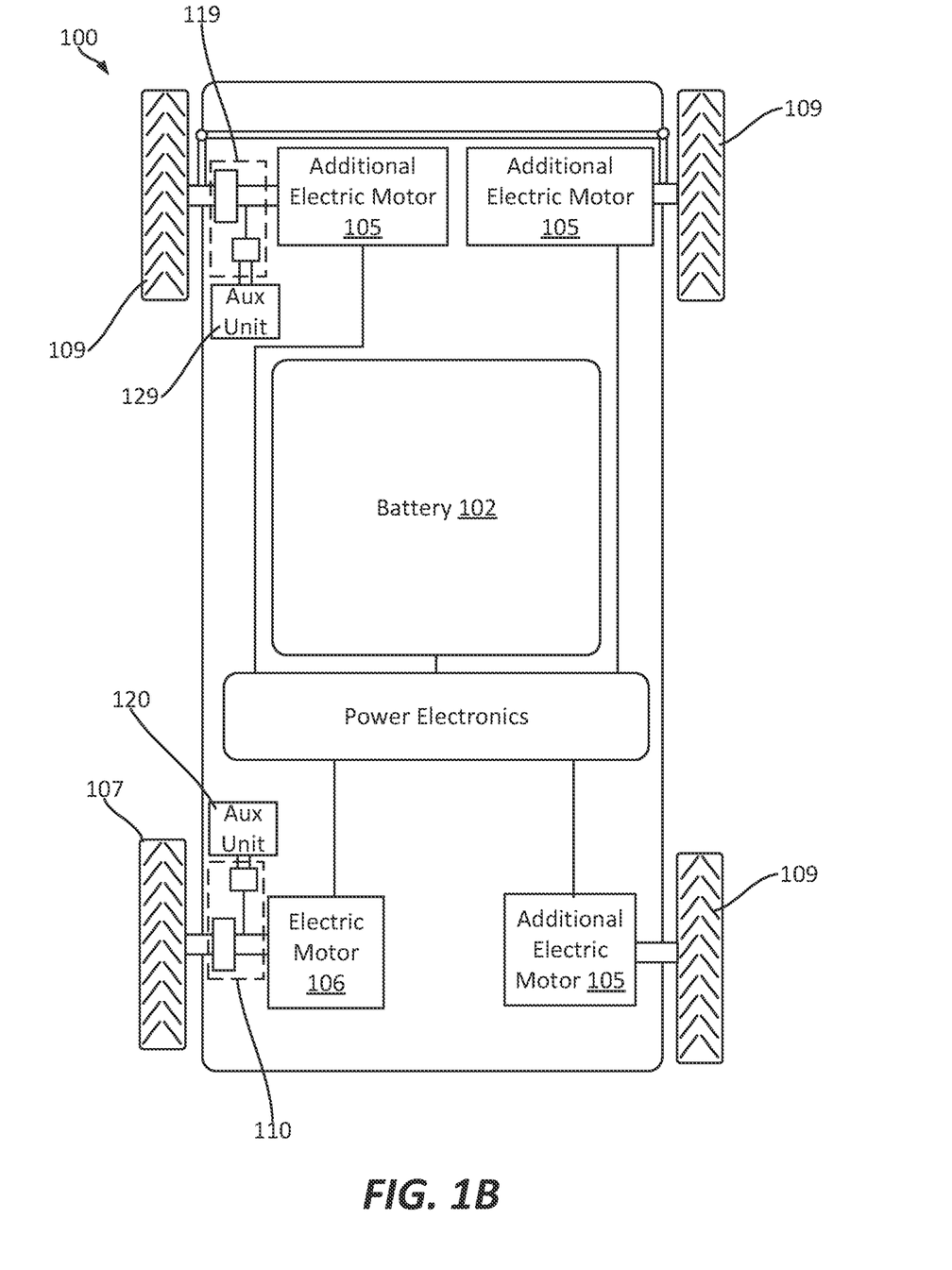
FIG. 1B is a schematic representation of another example of an electric vehicle comprising multiple power distribution systems, each configured to switch among multiple operating modes and selectively transfer mechanical power among its electric motor, wheel, and auxiliary unit.

FIG. 1B is a schematic illustration of another example of electric vehicle 100 in which electric motor 106 powers road wheel 107 individually/independently from other wheels. Additional wheel 109 (provided on the same axle) is powered independently by additional electric motor 105. This example may be referred to as a one-motor-per-wheel configuration. One having ordinary skill in the art would appreciate additional configurations (e.g., one-motor-per-multiple-axles configuration) and various combinations of these configurations on the same electric vehicle 100. For example, both wheels on one axle can be powered by one motor, while the wheels on another axle are independently powered by two separate motors. In some examples, every wheel of electric vehicle 100 has a dedicated electric motor as, e.g., is schematically shown in FIG. 1B.

When electric vehicle 100 has multiple electric motors, only one of these motors may be coupled to power distribution system 110. Alternatively, electric vehicle 100 may have multiple power distribution systems 110, each independently coupled to one of the electric motors as also shown in FIG. 1B illustrating additional power distribution system 119 connected to additional electric motor 105, additional road wheel 109, and additional auxiliary unit 129. Additional power distribution system 119 can be operated similarly to but independently from power distribution system 110. For example, additional power distribution system 119 and power distribution system 110 can be switched to different operating modes, further described below. In some examples, some auxiliary units (requiring mechanical power) may be positioned at the front of electric vehicle 100 and powered by one power distribution system 110, while additional auxiliary units (also requiring mechanical power) may be positioned at the end of electric vehicle 100 and powered by another power distribution system 110.

Referring to FIGS. 1A and 1B, electric vehicle 100 comprises battery 102, electric motor 106 electrically coupled to battery 102 (e.g., using various power electronics), power distribution system 110 mechanically coupled to electric motor 106, road wheel 107 mechanically coupled to power distribution system 110, and auxiliary unit 120 mechanically coupled to power distribution system 110. For purposes of this disclosure, an auxiliary unit is defined as a unit not assisting in propelling electric vehicle 100, but requiring mechanical power for its operation. It should be noted that electric vehicle 100 may include one or more auxiliary units that are not powered by corresponding power distribution systems (e.g., may have their own dedicated motors). Furthermore, electric vehicle 100 may include one or more auxiliary devices that do not require mechanical power for their operations (e.g., electrically powered devices such as resistive heaters, lights, and horn).

Various examples of electric vehicle 100 are within the scope. Some examples include but are not limited to a tractor, a mower, a rugged terrain vehicle (RTV), a forklift, and the like. In some examples, electric vehicle 100 has a gross weight of less than 2500 kilograms, less than 2000 kilograms, less than 1500 kilograms, or even less than 1000 kilograms. As noted above, electric vehicle 100 with a lower gross weight requires less powerful electric motor 106, therefore making electric motor 106 more efficient for powering auxiliary unit 120. In some examples, electric vehicle 100 has a maximum operating speed of less than 80 kilometers per hour, less than 60 kilometers per hour, or even less than 40 kilometers per hour. Electric vehicle 100 with a maximum operating speed also requires less powerful electric motor 106.

Various examples of auxiliary unit 120 are within the scope. Some examples include but are not limited to an air conditioner, a battery cooling system, a heat pump, a hydraulic pump, a power takeoff (PTO) unit, and the like. In some examples, auxiliary unit 120 may be also used to provide power to road wheel 107 (e.g., at slow speed) as further described below with reference to FIG. 2E. For example, auxiliary unit 120 can be equipped with a gearbox to enable this operation. In some examples, the maximum power demand of auxiliary unit 120 is at least 1 kW, at least 2 kW, or even at least 4 KW. For example, the maximum power demand of auxiliary unit 120 can be between 1 kW and 10 KW, between 2 kW and 10 KW, or between 4 kW and 10 kW.

Various examples of electric motor 106 are within the scope. In some examples, the maximum power output of electric motor 106 is less than 100 KW, less than 50 KW, less than 20 kW, or even less than 10 kW. For example, the maximum power output of electric motor 106 can be between 1 kW and 100 KW, between 10 kW and 80 kW, or between 20 kW and 60 kW.

In some examples, the ratio of the maximum power demand of auxiliary unit 120 to the maximum power output of electric motor 106 is between 0.1 and 0.8 or, more specifically, between 0.2 and 0.6. For a shorthand, this ratio may be referred to as a maximum power demand ratio. As a reference, a typical vehicle-propelling electric motor used on passenger vehicles has a power of over 100 KW, while a typical air-conditioning compressor requires less than 2 kW of power, providing a ratio of only 0.02. A higher ratio corresponds to a higher efficiency of using electric motor 106 to power auxiliary unit 120 (e.g., when no power is transferred to road wheel 107).

As noted above, power distribution system 110 is configured to switch among multiple operating modes and selectively transfer mechanical power among electric motor 106, road wheel 107, and auxiliary unit 120. The multiple operating modes comprise a wheel operating mode, an auxiliary operating mode, and a combined operating mode. However, additional modes are also within the scope. Various examples of these operating modes will now be described with reference to FIGS. 2A-2D.

Operating Mode Examples

Figure 2A:
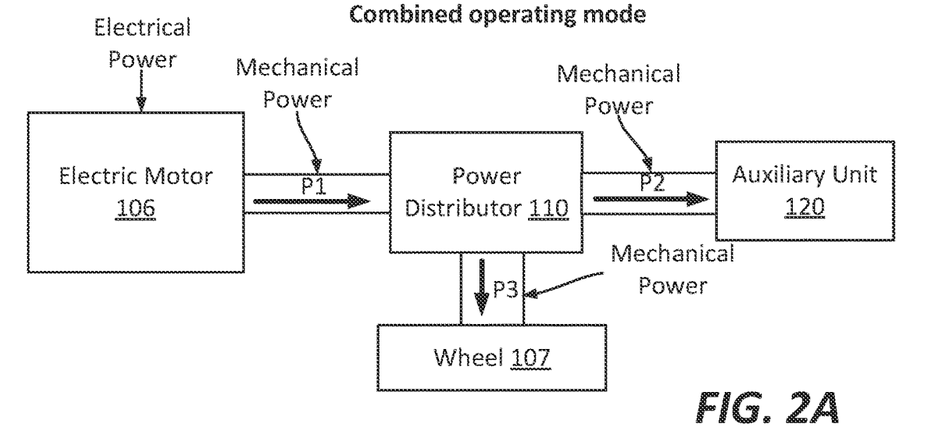
FIG. 2A is a block diagram of a power distribution system switched to a combined operating mode and selectively transferring mechanical power between the electric motor and each of the wheel and auxiliary unit, in accordance with some examples.

FIG. 2A is a block diagram of power distribution system 110 switched to a combined operating mode and selectively transferring mechanical power between electric motor 106 and each of road wheel 107 and auxiliary unit 120, in accordance with some examples. In the illustrated example, electric motor 106 receives electric power (e.g., from battery 102) and converts this electric power into mechanical power (P1) that is delivered to power distribution system 110. This mechanical power (P1) is distributed to auxiliary unit 120 (with P2 representing mechanical power delivered to auxiliary unit 120) and to road wheel 107 (with P3 representing mechanical power delivered to road wheel 107). Assuming no losses within power distribution system 110, then P1=P2+P3. In some examples, a portion of the total power delivered to auxiliary unit 120 to the total power (i.e., the P2/P3 ratio) is between 0.1 and 0.5 or, more specifically, between 0.1 and 0.3. Overall, when power distribution system 110 is switched to the combined operating mode, power distribution system 110 is configured to transfer mechanical power between electric motor 106 and each of auxiliary unit 120 and road wheel 107.

While FIG. 2A illustrates the mechanical power (P1) produced by electric motor 106 being distributed to auxiliary unit 120 (P2) and road wheel 107 (P3), other power distribution examples in this combined operating mode. For example, road wheel 107 can produce mechanical power to slow down electric vehicle 100. A portion of this power can be used to drive electric motor 106, operable as a generator. Furthermore, the remaining power can be used to drive auxiliary unit 120 (e.g., by switching to a reverse gear in the transmission of power distribution system 110).

Figure 2B:
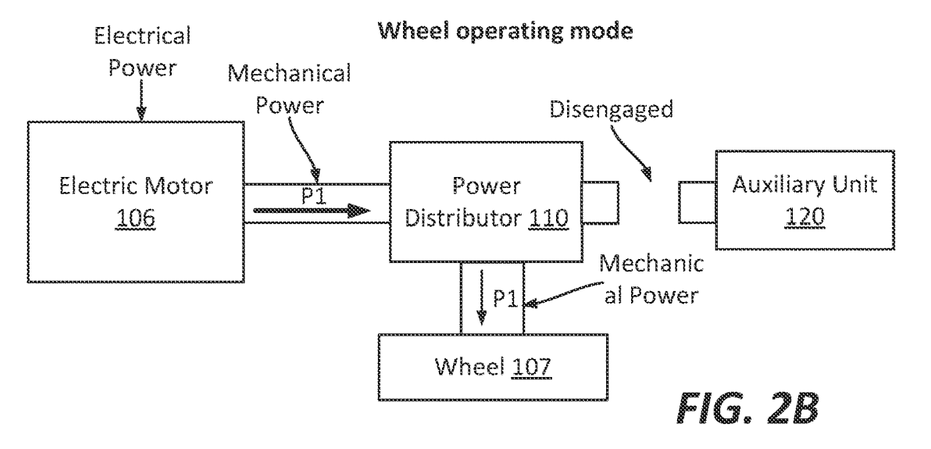
FIG. 2B is a block diagram of a power distribution system switched to a wheel operating mode and selectively transferring mechanical power between the electric motor and wheel, but not the auxiliary unit, in accordance with some examples.

FIG. 2B is a block diagram of power distribution system 110 switched to a wheel operating mode and selectively transferring mechanical power between electric motor 106 and road wheel 107 but not auxiliary unit 120, in accordance with some examples. In this mode, auxiliary unit 120 remains mechanically disconnected (by power distribution system 110) from both electric motor 106 and road wheel 107. The mechanical power (P1) produced by electric motor 106 is entirely delivered to road wheel 107 (P1). Overall, when power distribution system 110 is switched to the wheel operating mode, power distribution system 110 is configured to transfer mechanical power between electric motor 106 and road wheel 107 but not auxiliary unit 120.

Figure 2C:
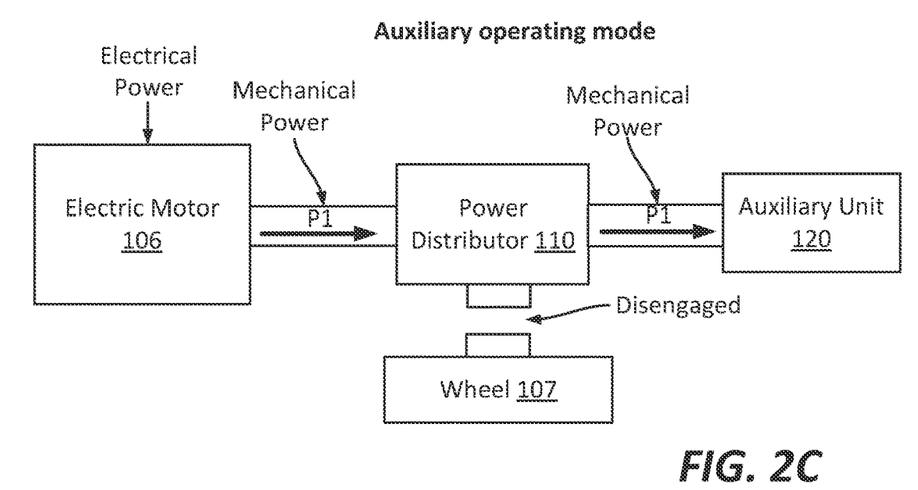
FIG. 2C is a block diagram of a power distribution system switched to an auxiliary operating mode and selectively transferring mechanical power between the electric motor and auxiliary unit, but not the wheel, in accordance with some examples.

FIG. 2C is a block diagram of power distribution system 110 switched to an auxiliary operating mode and selectively transferring mechanical power between electric motor 106 and auxiliary unit 120 but not road wheel 107, in accordance with some examples. In this mode, road wheel 107 remains mechanically disconnected (by power distribution system 110) from both electric motor 106 and auxiliary unit 120. The mechanical power (P1) produced by electric motor 106 is entirely delivered to auxiliary unit 120 (P1). Overall, when power distribution system 110 is switched to auxiliary operating mode, the power distribution system 110 is configured to transfer mechanical power between electric motor 106 and auxiliary unit 120 but not road wheel 107.

Figure 2D:
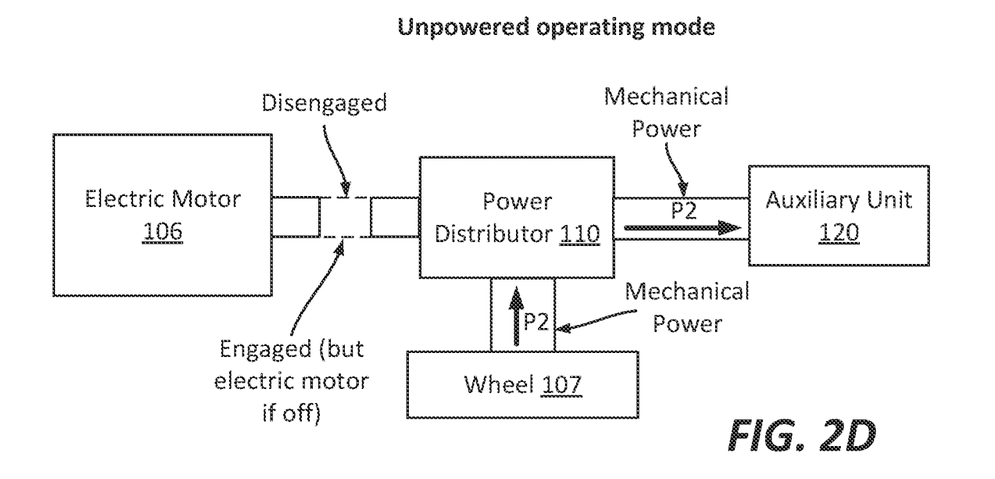
FIG. 2D is a block diagram of a power distribution system switched to an unpowered operating mode and selectively transferring mechanical power between the wheel and auxiliary unit, but not the electric motor, in accordance with some examples.

FIG. 2D is a block diagram of power distribution system 110 switched to an unpowered operating mode and selectively transferring mechanical power between road wheel 107 and auxiliary unit 120 but not electric motor 106, in accordance with some examples. In this mode, electric motor 106 remains mechanically disconnected (by power distribution system 110) from both road wheel 107 and auxiliary unit 120. The mechanical power (P2) produced by road wheel 107 (e.g., to slow down electric vehicle 100) is entirely delivered to auxiliary unit 120 (P2). For example, the power from road wheel 107 can be directly recovered to drive a compressor of a heat pump. Overall, when power distribution system 110 is switched to unpowered operating mode, power distribution system 110 is configured to transfer mechanical power between road wheel 107 and auxiliary unit 120 but not electric motor 106 when power distribution system 110 is switched to unpowered operating mode.

Figure 2E:
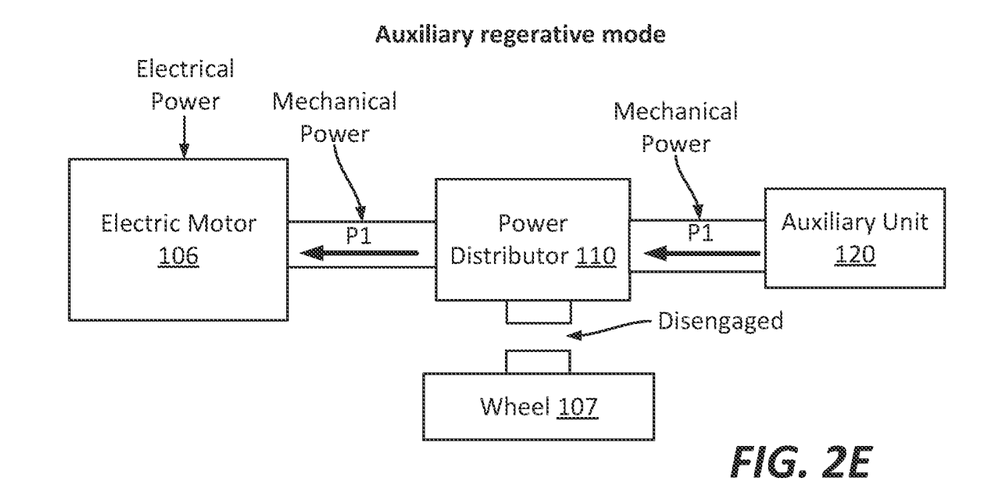
FIG. 2E is a block diagram of a power distribution system switched to an auxiliary regenerating mode and selectively transferring mechanical power from the auxiliary unit to the electric motor, but not the wheel, in accordance with some examples.

FIG. 2E is a block diagram of power distribution system 110 switched to an auxiliary regenerating mode and selectively transferring mechanical power from auxiliary unit 120 to electric motor 106, but not road wheel 107, in accordance with some examples. The auxiliary regenerating mode may be viewed as a specific example of the auxiliary operating mode, which also includes an option of transferring mechanical power from electric motor 106 to auxiliary unit 120. One specific example of the auxiliary regenerating mode is a forklift lowering a load and driving the hydraulic pump (operable as auxiliary unit 120), which, in turn, transfer the power to electric motor 106 operating in a regenerative mode.

Power Distribution Unit Examples

Figure 3:
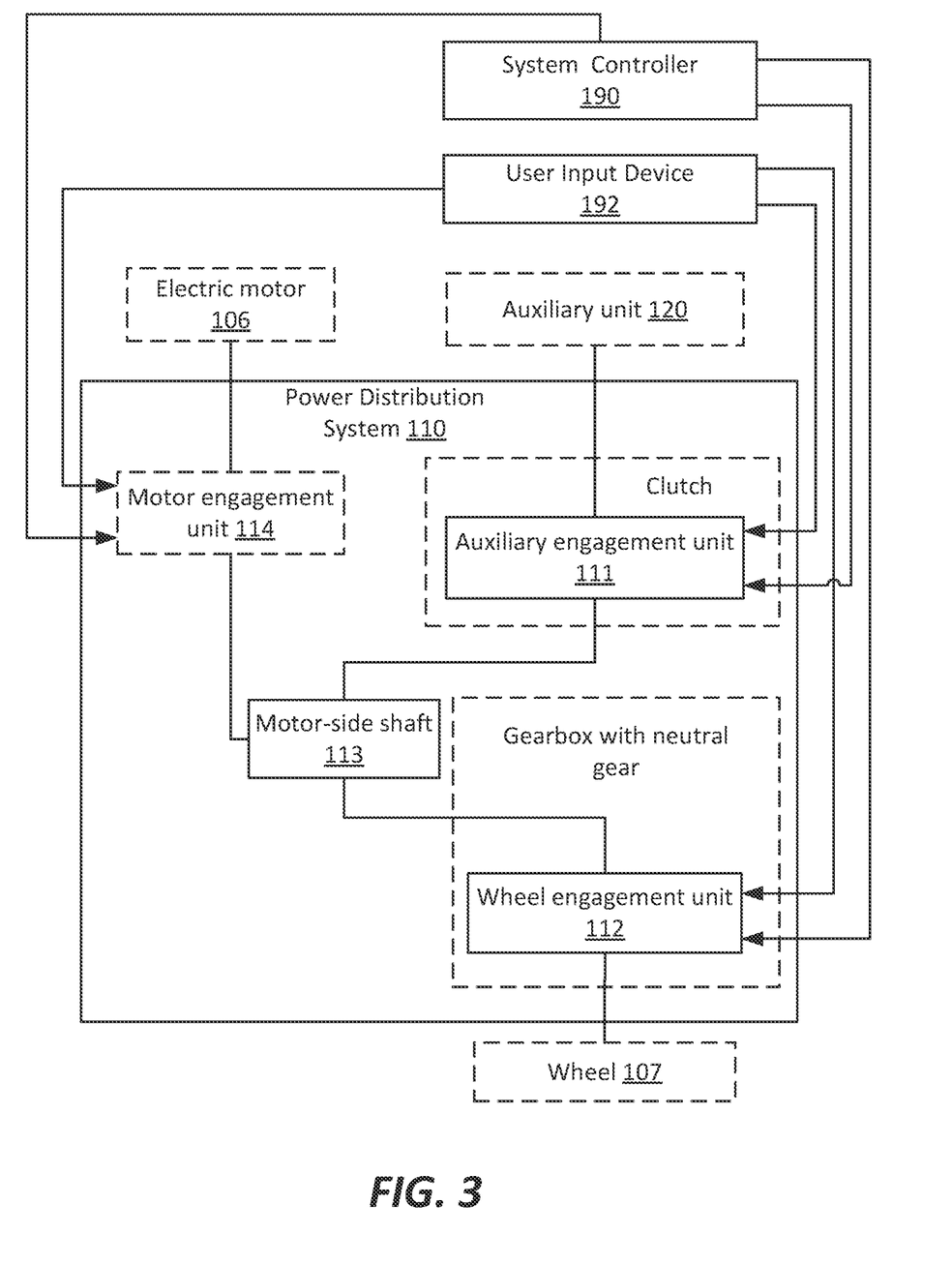
FIG. 3 is a block diagram of a power distribution system illustrating various components of the system and connections between these components, in accordance with some examples.

FIG. 3 is a block diagram of power distribution system 110 illustrating various components of power distribution system 110 and connections between these components, in accordance with some examples.

In some examples, power distribution system 110 comprises wheel engagement unit 112 and auxiliary engagement unit 111. First engagement unit 111 is mechanically coupled to road wheel 107 and is engaged when power distribution system 110 is switched into either the wheel operating mode or the combined operating mode. When wheel engagement unit 112 is engaged, a mechanical connection is formed between electric motor 106 and road wheel 107. Furthermore, wheel engagement unit 112 is disengaged when power distribution system 110 is switched to an auxiliary operating. When wheel engagement unit 112 is disengaged, there is no mechanical connection between electric motor 106 and road wheel 107. In this mode, electric motor 106 can rotate without propelling electric vehicle 100 (e.g., to power auxiliary unit 120).

Similarly, auxiliary engagement unit 111 is mechanically coupled to auxiliary unit 120 and is engaged when power distribution system 110 is switched into either the auxiliary operating mode or the combined operating mode. When auxiliary engagement unit 111 is engaged, a mechanical connection is formed between electric motor 106 and auxiliary unit 120. Furthermore, auxiliary engagement unit 111 is disengaged when power distribution system 110 is switched to a wheel operating mode. When auxiliary engagement unit 111 is disengaged, there is no mechanical connection between electric motor 106 and auxiliary unit 120.

In some examples, power distribution system 110 comprises motor-side shaft 113 permanently mechanically coupled to each of wheel engagement unit 112 and auxiliary engagement unit 111. In some examples, motor-side shaft 113 is permanently coupled to electric motor 106. It should be noted that in some examples, electric motor 106 is not a part of power distribution system 110. However, power distribution system 110 and electric motor 106 can be integrated into the same housing, in some examples. Alternatively, electric motor 106 is coupled to motor-side shaft 113 by motor engagement unit 114. Motor engagement unit 114 is optional and, in some examples, electric motor 106 is constantly coupled to power distribution system 110. For example, electric motor 106 may be turned off/unpowered (no regenerative load) such that electric motor 106 only experiences a bearing drag, which is negligible relative to the power transfer between road wheel 107 and auxiliary unit 120 during the unpowered operating mode. In other words, electric motor 106 can be operable as its own motor engagement unit 114 by changing the power demands on electric motor 106 (powering on/off).

When motor engagement unit 114 is present (as a separate unit from electric motor 106), motor engagement unit 114 is engaged when power distribution system 110 is switched into either the auxiliary operating mode, the wheel operating mode, or the combined operating mode. When motor engagement unit 114 is engaged, a mechanical connection is formed between electric motor 106 and motor-side shaft 113. Furthermore, motor engagement unit 114 is disengaged when power distribution system 110 is switched to an unpowered operating mode. When motor engagement unit 114 is disengaged, there is no mechanical connection between electric motor 106 and motor-side shaft 113.

Various examples of engagement units are within the scope, e.g., clutches, gearboxes, and other selective power transmission units. In some examples, motor engagement unit 114 is a clutch. In the same or other examples, wheel engagement unit 112 is a clutch or, more specifically, an electromagnetic clutch. An electromagnetic clutch can be easily controlled and can be used for various types of auxiliary unit 120.

Overall, different other types of clutches are within the scope to be used as auxiliary engagement unit 111, wheel engagement unit 112, and/or motor engagement unit 114. Additional examples include dog clutches, spline clutches, dry plate clutches, wet clutches, and belt clutches. Dog clutches use tooth-like projections (which are referred to as "dogs") on the outer surfaces to engage and disengage other power-transmission components providing instantaneous engagement and making dog clutches particularly suitable for high-speed applications. In some examples, dog clutches are manually shifted. Alternatively, power distribution system 110 is equipped with an actuator for switching the dog clutch or any other type of clutch. Spline clutches use a series of ridges or teeth (splines) as mating surfaces such that the spline teeth mesh together allowing torque to be transferred. Spline clutches can allow for some misalignment or movement between shafts. Dry plate clutches may be also referred to as friction clutches and use friction between two plates to transmit torque. Wet clutches are similar to dry plate clutches but operate in a lubricating fluid (e.g., oil), which helps to dissipate heat and to provide smoother operation. Wet clutches can be used where higher torque capacities and enhanced cooling are required. Belt clutches use belts that are engaged by tightening, creating friction, and transmitting torque. Belt clutches can be used in continuously variable transmissions (CVTs). Unlike electromagnetic clutches, dog clutches, spline clutches, dry plate clutches, wet clutches, and belt clutches can be mechanically actuated. However, electromechanical actuators are also within the scope. In some examples, a clutch can be integrated into auxiliary unit 120 (e.g., an electromagnetic clutch being a part of an A/C compressor, or hydraulic pump).

In some examples, second engagement unit 112 is a gearbox configured to switch to a neutral gear when disengaged in wheel operating mode. In some examples, the gearbox comprises multiple drive gears in addition to the neutral gear. These drive gears can be used to adjust the relative speeds of road wheel 107 and motor 106, which can be particularly useful for off-road vehicles. It should be noted that adjusting the relative speeds of road wheel 107 and motor 106 can also adjust the relative speeds of road wheel 107 and auxiliary unit 120 in a combined operating mode or an unpowered operating mode.

Various engagement units can be controlled based on input from system controller 190 and/or user input device 192. For example, a driver may operate a switch (e.g., similar to a gear shifter) to select either one of the operating modes of power distribution system 110. In some examples, user input device 192 can include an accelerator sensor (e.g., pressing the accelerator sensor indicates that the power is needed from electric motor 106 at road wheel 107 and power distribution system 110 needs to be switched to a combined operating mode or a wheel operating mode.

Vehicle Operating Examples

Figure 4:
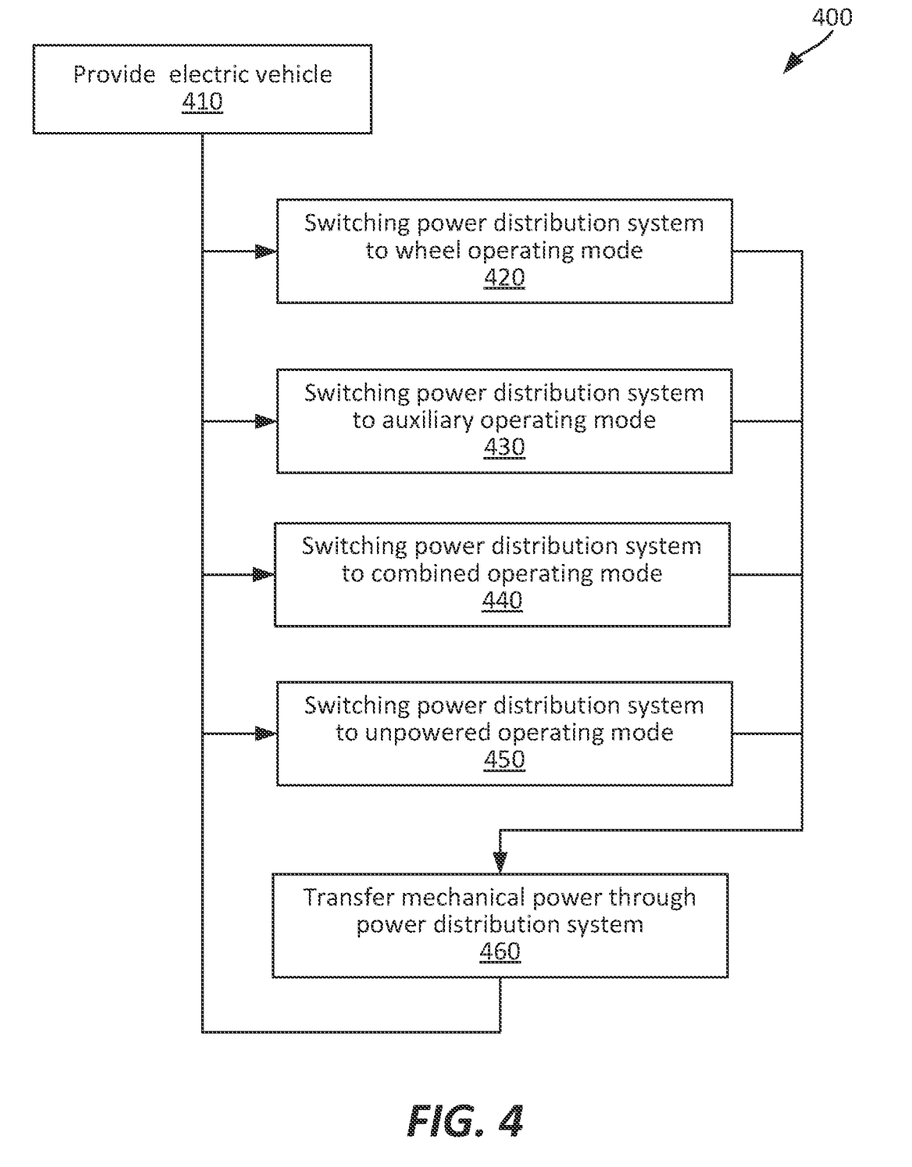
FIG. 4 is a process flow diagram corresponding to a method of operating an electric vehicle comprising a power distribution system configured to switch among multiple operating modes and selectively transfer mechanical power among the electric motor, wheel, and auxiliary unit, in accordance with some examples.

FIG. 4 is a process flow diagram corresponding to method 400 of operating electric vehicle 100 comprising power distribution system 110, in accordance with some examples. Power distribution system 110 is configured to switch among multiple operating modes and selectively transfer mechanical power among electric motor 106, road wheel 107, and auxiliary unit 120, in accordance with some examples. Various examples of electric vehicle 100 and power distribution system 110 are described above.

In some examples, method 400 commences with (block 410) providing electric vehicle 100 comprising battery 102, electric motor 106 electrically coupled to battery 102, power distribution system 110 mechanically coupled to electric motor 106, road wheel 107, and auxiliary unit 120. As noted above, power distribution system 110 is configured to switch among multiple operating modes and selectively transfer mechanical power from electric motor 106 to one or both of road wheel 107 and auxiliary unit 120. The multiple operating modes comprise a wheel operating mode, an auxiliary operating mode, and a combined operating mode. In some examples, power distribution system 110 is configured to switch into an unpowered operating mode.

In some examples, various vehicle inputs are used for selecting one of the operating modes. Some examples of such inputs include, but are not limited to, an accelerator pedal position, a brake pedal position, a gear selection, actuation of auxiliary unit 120, sensor inputs (e.g., battery temperature), and the like.

In some examples, method 400 comprises (block 420) switching power distribution system 110 to a wheel operating mode such that power distribution system 110 transfers mechanical power between electric motor 106 and road wheel 107 but not auxiliary unit 120. For example, this switching operation can comprise engaging wheel engagement unit 112 and disengaging auxiliary engagement unit 111. More specifically, when wheel engagement unit 112 is a gearbox, the gearbox can be switched into a drive gear. In some examples, switching to this wheel operating mode can involve a driver/actuator changing to a drive gear.

In some examples, method 400 comprises (block 430) switching power distribution system 110 to an auxiliary operating mode such that power distribution system 110 transfers mechanical power between electric motor 106 and auxiliary unit 120 but not road wheel 107. For example, this switching operation can comprise disengaging wheel engagement unit 112 (e.g., switching the gearbox into a neutral gear) and engaging auxiliary engagement unit 111.

In some examples, method 400 comprises (block 440) switching power distribution system 110 to a combined operating mode such that power distribution system 110 transfers mechanical power between electric motor 106 and both auxiliary unit 120 and road wheel 107. For example, this switching operation can comprise engaging both wheel engagement unit 112 and auxiliary engagement unit 111.

In some examples, method 400 comprises (block 450) switching power distribution system 110 to an unpowered operating mode such that power distribution system 110 transfers mechanical power between electric motor 106 and both auxiliary unit 120 and road wheel 107. For example, this switching operation can comprise engaging both wheel engagement unit 112 and auxiliary engagement unit 111 and disengaging motor engagement unit 114.

It should be noted that an engagement unit can be already in the required engagement/disengagement stated using this mode-switching operation. For example, switching from a combined operating mode to an unpowered operating mode simply requires disengaging motor engagement unit 114, while both wheel engagement unit 112 and auxiliary engagement unit 111 remain engaged. Switching from a combined operating mode to an auxiliary operating mode simply requires disengaging wheel engagement unit 112, while auxiliary engagement unit 111 remains engaged (as well as motor engagement unit 114, if one is present). Finally, switching from a combined operating mode to a wheel operating mode simply requires disengaging auxiliary engagement unit 111, while wheel engagement unit 112 remains engaged (as well as motor engagement unit 114, if one is present).

Regardless of the operating mode, method 400 can proceed with (block 460) transferring mechanical power through power distribution system 110. However, the distribution of this power depends on the operating mode of power distribution system 110 as described above with reference to FIGS. 2A-2D.

The process in FIG. 4 is continuously repeated during the operation of electric vehicle 100, e.g., as new inputs are received at power distribution system 110

CONCLUSION

Although the foregoing concepts have been described in some detail for purposes of clarity of understanding, it will be apparent that certain changes and modifications may be practiced within the scope of the appended claims. It should be noted that there are many alternative ways of implementing processes, systems, and apparatuses. Accordingly, the present examples are to be considered illustrative and not restrictive.

The invention claimed is:

1. A power distribution system for use on an electric vehicle comprising an electric motor, the power distribution system comprising:
an auxiliary engagement unit configured to mechanically couple to an auxiliary unit of the electric vehicle; and
a wheel engagement unit configured to mechanically couple to a wheel of the electric vehicle, wherein:
the power distribution system is configured to switch among multiple operating modes and selectively transfer mechanical power among the electric motor, the wheel, and the auxiliary unit during operation of the electric vehicle,
the multiple operating modes comprise at least a wheel operating mode and an auxiliary operating mode,
in the wheel operating mode, the auxiliary engagement unit is disengaged corresponding to no mechanical connection to the auxiliary unit while the wheel engagement unit is engaged forming a mechanical connection to the wheel, and
in the auxiliary operating mode, the auxiliary engagement unit is engaged forming a mechanical connection to the auxiliary unit while the wheel engagement unit is disengaged corresponding to no mechanical connection to the wheel.

2. The power distribution system of claim 1, wherein, in the wheel operating mode, the wheel is mechanically connected to the electric motor.

3. The power distribution system of claim 1, wherein, in the auxiliary operating mode, the auxiliary unit is mechanically connected to the electric motor.

4. The power distribution system of claim 1, wherein:
the multiple operating modes further comprise a combined operating mode, and
in the combined operating mode, both the auxiliary engagement unit and the wheel engagement unit are engaged forming a mechanical connection to the auxiliary unit and also forming a mechanical connection to the wheel.

5. The power distribution system of claim 1, further comprising a motor-side shaft for permanent coupling to the electric motor of the electric vehicle, wherein the motor-side shaft is coupled to each of the auxiliary engagement unit and the wheel engagement unit.

6. The power distribution system of claim 1, wherein the auxiliary engagement unit is an electromagnetic clutch.

7. The power distribution system of claim 1, wherein the wheel engagement unit is a gearbox having a neutral gear, and wherein switching the power distribution system to the auxiliary operating mode comprises switching the gearbox into the neutral gear.

8. The power distribution system of claim 7, wherein:
the gearbox of the wheel engagement unit has multiple drive gears corresponding to different rotational speed ratios of a gearbox input shaft and a gearbox output shaft,
the gearbox input shaft is mechanically coupled to the electric motor and to the auxiliary engagement unit, and
the gearbox output shaft is mechanically coupled to the wheel.

9. The power distribution system of claim 1, further comprising a motor engagement unit configured to mechanically couple to the electric motor of the electric vehicle, wherein:
the motor engagement unit is coupled to each of the auxiliary engagement unit and the wheel engagement unit,
the multiple operating modes further comprise an unpowered operating mode,
in the unpowered operating mode, the motor engagement unit is disengaged corresponding to no mechanical connection to the electric motor,
in the unpowered operating mode, both the auxiliary engagement unit and the wheel engagement unit are engaged forming a mechanical connection to the auxiliary unit and also forming a mechanical connection to the wheel.

10. The power distribution system of claim 9, wherein the motor engagement unit is a clutch.

11. A method of operating an electric vehicle comprising an electric motor, a wheel, an auxiliary unit, and a power distribution system comprising an auxiliary engagement unit and a wheel engagement unit such that the auxiliary engagement unit is mechanically coupled to the auxiliary unit and the electric motor and such that the wheel engagement unit is mechanically coupled to the wheel and the electric motor, the method comprising:

switching the power distribution system to a wheel operating mode by engaging the wheel engagement unit and disengaging the auxiliary engagement unit thereby transferring mechanical power between the electric motor and the wheel but not between the electric motor and the auxiliary unit; and switching the power distribution system to an auxiliary operating mode by disengaging the wheel engagement unit and engaging the auxiliary engagement unit thereby transferring mechanical power between the electric motor and the auxiliary unit but between the electric motor and the wheel.

12. The method of claim 11, further comprising switching the power distribution system to a combined operating mode by engaging both the wheel engagement unit and the auxiliary engagement unit thereby transferring mechanical power between the electric motor and each of the auxiliary unit and the wheel.

13. The method of claim 11, wherein the auxiliary unit is one of an alternator, an air conditioner, a heat pump, a hydraulic pump, or a power takeoff (PTO) unit.

14. The method of claim 11, wherein a maximum power demand ratio of the auxiliary unit to the electric motor is between 0.1 and 0.8.

15. The method of claim 11, wherein a maximum power output of the electric motor is less than 100 kW.

16. The method of claim 11, wherein a maximum power demand of the auxiliary unit is between 1 kW and 10 kW.

17. The method of claim 11, wherein:

the power distribution system further comprises a motor engagement unit mechanically coupled to the electric motor and each of the auxiliary engagement unit and the wheel engagement unit, and the method further comprises switching the power distribution system to an unpowered operating mode by disengaging the motor engagement unit and engaging each of the wheel engagement unit and the auxiliary engagement unit thereby transferring mechanical power between the auxiliary unit and the wheel but not the electric motor, wherein, in the unpowered operating mode, the wheel and the auxiliary and mechanically coupled to each other and decoupled from the electric motor.

18. The method of claim 11, wherein the power distribution system comprises a motor-side shaft permanently coupled to the electric motor and each of the auxiliary engagement unit and the wheel engagement unit.

19. The method of claim 11, wherein the electric vehicle further comprises a user input device for engaging and disengaging each of the auxiliary engagement unit and the wheel engagement unit by selecting one of operating modes comprising the wheel operating mode and the auxiliary operating mode.

20. The method of claim 19, wherein the user input device comprises an accelerator sensor.

* * * * *